US008226074B1

(12) United States Patent
Hughey

(10) Patent No.: US 8,226,074 B1
(45) Date of Patent: Jul. 24, 2012

(54) ADJUSTABLE CORNER CLAMPING APPARATUS

(76) Inventor: Christopher N. Hughey, Petoskey, MI (US)

( * ) Notice: Subject to any disclaimer, the term of this patent is extended or adjusted under 35 U.S.C. 154(b) by 114 days.

(21) Appl. No.: 12/716,536

(22) Filed: Mar. 3, 2010

Related U.S. Application Data

(60) Provisional application No. 61/209,184, filed on Mar. 4, 2009.

(51) Int. Cl.

| | |
|---|---|
| ***G11B 3/00*** | (2006.01) |
| ***G11B 19/24*** | (2006.01) |
| ***G11B 7/26*** | (2006.01) |
| ***G11B 5/84*** | (2006.01) |
| ***G11B 3/70*** | (2006.01) |
| ***H04B 1/20*** | (2006.01) |
| ***B25B 13/46*** | (2006.01) |
| *B25B 1/00* | (2006.01) |

(52) U.S. Cl. ................ 269/155; 269/3; 269/6; 269/238; 269/274; 81/62

(58) Field of Classification Search .................. 269/155, 269/3, 6, 43, 48, 156, 164, 165, 121, 219.1, 269/238, 254 R, 274, 208, 249; 83/62, 522.19, 83/581

See application file for complete search history.

(56) References Cited

U.S. PATENT DOCUMENTS 1,168,147 A * 1/1916 Bender ........................... 249/48
1,169,671 A * 1/1916 Nihlen ........................... 269/41
1,587,682 A * 6/1926 Siegfried et al. ................ 269/77
2,366,350 A * 1/1945 Ostling ......................... 269/249
2,568,233 A * 9/1951 Hamilton ........................ 269/43
2,627,113 A * 2/1953 Moray .......................... 433/154
3,795,393 A * 3/1974 Melfi ............................ 269/116
3,934,316 A * 1/1976 Driscoll .......................... 24/486
4,056,030 A 11/1977 Hahn
4,234,176 A * 11/1980 Goff et al. ..................... 269/156
4,236,702 A * 12/1980 Keddie ............................ 269/41
4,247,090 A * 1/1981 Hahn et al. ...................... 269/41
4,373,980 A * 2/1983 Skalmierski et al. ......... 156/160
4,398,706 A * 8/1983 Kaulfuss ......................... 269/88
4,498,662 A * 2/1985 Halter ........................... 269/101
4,592,541 A * 6/1986 Huray ........................... 269/155
4,607,829 A * 8/1986 Suska ............................ 269/88
4,800,054 A * 1/1989 Roestenberg ................... 264/86
4,828,241 A * 5/1989 Yang ............................ 269/114
4,962,918 A * 10/1990 Yang ............................ 269/156
5,018,711 A * 5/1991 Johnson .......................... 269/43
5,094,435 A * 3/1992 Depperman et al. ............ 269/43
5,384,978 A * 1/1995 Peters ............................ 40/785
5,423,626 A * 6/1995 Peters ........................... 403/362
5,513,838 A * 5/1996 Van Rossum ................. 269/203
5,664,643 A * 9/1997 Taylor, Jr. ..................... 182/214
5,884,904 A * 3/1999 Martini ........................... 269/41
5,992,836 A * 11/1999 Howe ............................. 269/41
6,038,829 A * 3/2000 Franks ............................ 52/645
6,196,356 B1 * 3/2001 Sneed ........................... 187/408
6,209,859 B1 * 4/2001 Chung ........................... 269/111
(Continued)

*Primary Examiner* — Lee D Wilson
*Assistant Examiner* — Alvin Grant
(74) *Attorney, Agent, or Firm* — Northern Michigan Patent Law, PLC

(57) ABSTRACT

A corner clamping apparatus capable of adjustably clamping two joined, mitered corner pieces to form a 90-degree corner with a single clamp. The clamping apparatus includes three rigid L-shaped supports, adjustably mounted relative to one another to accommodate differently sized corner pieces and/or variations in the corner pieces or their mitered edges. Four adjustable clamping feet retained in the rigid L serve to adjust the corner pieces to produce an exact miter joint or seam, and to hold the adjusted corner pieces until they can be more permanently joined.

7 Claims, 4 Drawing Sheets

U.S. PATENT DOCUMENTS

| | | | | |
|---|---|---|---|---|
| 6,216,524 | B1 * | 4/2001 | Weschler | 72/457 |
| 6,233,900 | B1 * | 5/2001 | Gill | 52/749.1 |
| 6,450,491 | B1 * | 9/2002 | McEvoy | 269/118 |
| 6,708,966 | B1 * | 3/2004 | Troudt | 269/249 |
| 6,889,968 | B1 * | 5/2005 | Wong | 269/91 |
| 7,168,693 | B1 | 1/2007 | Sjuts et al. | |
| 2001/0042985 | A1 * | 11/2001 | Hodge | 296/26.08 |
| 2005/0073080 | A1 * | 4/2005 | Woodbury | 269/41 |
| 2011/0107610 | A1 * | 5/2011 | Farr et al. | 33/421 |
| 2011/0129210 | A1 * | 6/2011 | McGucken | 396/422 |

* cited by examiner

ADJUSTABLE CORNER CLAMPING APPARATUS

RELATED APPLICATIONS/PRIORITY BENEFIT CLAIM

This application claims the benefit of U.S. Provisional Application No. 61/209,184 filed Mar. 4, 2009 by the same inventor (Hughey), the entirety of which provisional application is incorporated herein by reference.

FIELD

The subject matter of the present application is in the field of clamping apparatus for use in producing corners from mating corner pieces with mitered mating edges, by securely retaining the corner pieces in a corner arrangement.

BACKGROUND

Devices relating to frame and corner clamps and miters are known. U.S. Pat. No. 4,056,030 to Hahn is directed to a combination miter box, corner clamp, and measuring gauge based on a machined metal, V-shaped structure. However, the Hahn apparatus is not capable of generating longitudinal axis compression of framing strips or corner pieces. Further, the arrangement of the clamping screws in the Hahn apparatus limits its capability for clamping wide frame strips. Finally, the Hahn apparatus is a complex design requiring customized metal machining.

U.S. Pat. No. 4,247,090 to Hahn et al teaches a corner clamp using a similar machined metal, V-shaped structure. This apparatus adds a z-plane member capable of clamping to a work bench. However, the apparatus is otherwise subject to the same limitations as the prior Hahn device.

U.S. Pat. No. 7,168,693 to Sjuts et al is directed to an adjustable angle clamp. This apparatus uses adjustable clamping jaws disposed on opposing arm members to provide adjustable-angle clamping of two pieces to be joined along a seam. However, the Sjuts et al reference is limited in the width of material it will clamp, and does not readily allow for adjusting the miter seam.

BRIEF SUMMARY

What is disclosed and claimed herein is an adjustable corner clamping apparatus including, in combination, first, second, and third rigid L supports and first, second, third, and fourth clamping feet. A first rigid L support includes first and second legs. A second rigid L support also includes first and second legs. The first legs of the first and second rigid L supports are slidingly coupled together. As a result, the second legs of the first and second rigid L supports are held in parallel. Further, the distance between the second legs of the first and second rigid L supports is adjustable.

A third rigid L support includes first and second legs. The second legs of the first and third rigid L supports are slidingly coupled together. As a result, the first legs of the first and third rigid L supports are held in parallel. Further, the distance between the first legs of the first and third rigid L supports is adjustable.

A first clamping foot is adjustably retained in the first leg of the first rigid L support. A second clamping foot is adjustably retained in the second leg of the first rigid L support. A third clamping foot is adjustably retained in the second leg of the second rigid L support. A fourth clamping foot is adjustably retained in the first leg of the third rigid L support. As a result of this unique arrangement of supports and clamping feet, cooperative action between the first, second, third, and fourth clamping feet is operative to receive and securely retain a pair of frame strips or similarly mitered pieces in a corner arrangement.

While the terms "frame strips" or "framing strips" has been used so far to generally describe the pieces held together by my clamping apparatus, the term "corner piece" will be used in their place hereafter. All of these terms should be construed to include any mating frame or corner pieces with opposingly-angled or mitered mating edges with which it is desirable to form a tight, clean, even seam where the pieces are joined to form a right-angle corner. For example, the preferred use of my clamping apparatus is in securing, aligning, and retaining mitered wood stock, for example common "1×" or "2×" wood stock used to form right-angle corner trim on a house or a cabinet. Another possible use of the clamping apparatus, without implying limitation, is in forming square newel posts.

My clamping apparatus optimally addresses several critical issues typical to corner clamping. These issues include the need (1) to adjust for different corner piece lengths, (2) to adjust for different corner piece widths, (3) to generate adequate compression between the mated corner pieces, (4) to compensate for variations in the miter seam, and (5) to provide an economical and easy to manufacture clamping apparatus.

The clamping apparatus functions by receiving corner pieces therein to form a corner or by being applied to already-mated corner pieces to secure them in place while they are more permanently fastened, for example by allowing previously-applied adhesive to set, and/or by nailing or screwing the joined corner pieces together.

These and other features and advantages of the invention will become apparent from the detailed description below, in light of the accompanying drawings.

DETAILED DESCRIPTION

Referring to FIGS. 1 through 4, a corner clamping apparatus is shown in exemplary form in order to teach how to make and use the claimed invention.

Figure 1:
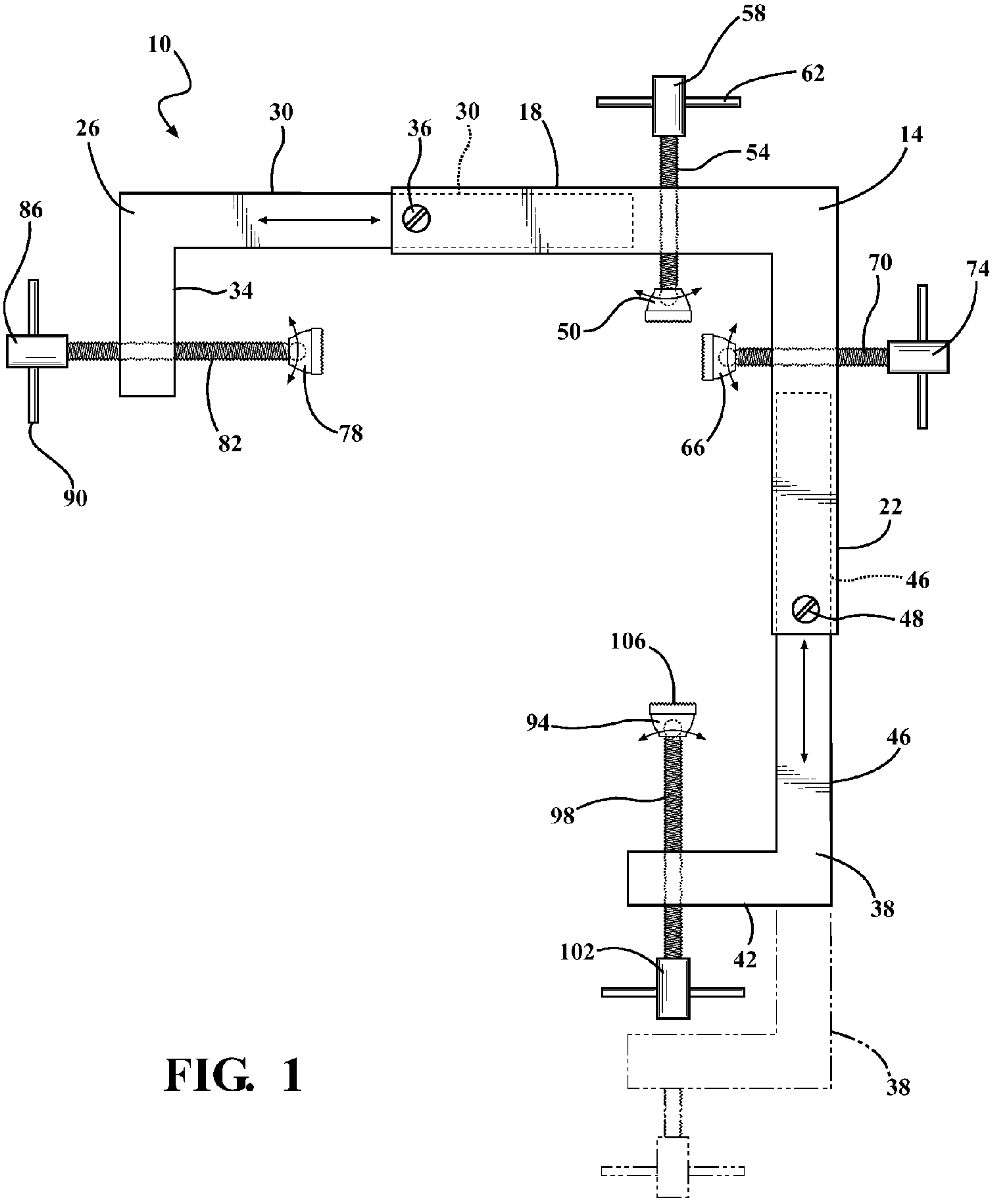
FIG. 1 is a top view of a corner clamping apparatus according to a preferred example of the present invention.

In FIG. 1, a corner clamping apparatus 10 includes a first rigid L support 14, a second rigid L support 26, a third rigid L support 38, a first clamping foot 50, a second clamping foot 66, a third clamping foot 78, and a fourth clamping foot 94. The rigid L supports 14, 26, and 38 are so named for their general "L" shapes. The first rigid L support 14 has a first leg 18 and a second leg 22. The second rigid L support 26 also has a first leg 30 and a second leg 34.

The first leg 18 of the first rigid L support 14 and the first leg 30 of the second rigid L support 26 are slidingly coupled together. For example, the rigid L supports may be fabricated from square steel tubing. In the illustrated embodiment, the first rigid L support 14 is fabricated tubing stock of somewhat larger cross section than the second rigid L support 26. As a result, the first leg 30 of the second rigid L support 26 slides into the first leg 1 of the first rigid L support 14. Alternatively, the second rigid L support 26 could be made larger such that the first rigid L support 14 could slide into the second rigid L support. The position of the coupling of the first and second rigid L supports 14 and 26 may be fixed using, for example, a set screw 36 that is retained in one of the legs while frictionally coupled to the other. As a result of such a coupling, the second leg 22 of the first rigid L support 14 and second leg 34 of the second rigid L support 26 are held in parallel. Further, the distance between the second leg 22 of the first rigid L support 14 and the second leg 34 of the second rigid L support 26 is adjustable based on the position of the sliding coupling as fixed by the set screw 36.

A third rigid L support 38 has a first leg 42 and second leg 46. The second leg 22 of the first rigid L support 14 and the second leg 46 of the third rigid L support 38 are slidingly coupled together. In the illustrated embodiment, the second leg 46 of the third rigid L support 38 slides into the second leg 22 of the first rigid L support 14. Alternatively, the first rigid L support 14 may be made to slide into the third rigid L support 38. The position of the coupling of the first and third rigid L supports 14 and 38 may also be fixed using a set screw 48 retained in one of the legs while frictionally coupled to the other. As a result of such a coupling, the first leg 18 of the first rigid L support 14 and first leg 42 of the third rigid L support 38 are held in parallel. Further, the distance between the first leg 18 of the first rigid L support 14 and the first leg 42 of the third rigid L support 38 is adjustable based on the position of the sliding coupling as fixed by the set screw 48.

A first clamping foot 50 is adjustably retained in the first leg 18 of the first rigid L support 14. A second clamping foot 66 is adjustably retained in the second leg 22 of the first rigid L support 14. A third clamping foot 78 is adjustably retained in the second leg 34 of the second rigid L support 26. A fourth clamping foot 94 is adjustably retained in the first leg 42 of the third rigid L support 38. The first, second, third, and fourth clamping feet 50, 66, 78, and 94 are preferably each attached to a separate threaded spindle 54, 70, 82, and 98 to provide a means both for retention in their respective legs and for making adjustments to the feet positions. The position of each threaded spindle may be adjusted by turning the spindle clockwise or counterclockwise. As each spindle is turned, the relative positions of each clamping foot may be adjusted to accommodate a work piece, not shown.

Each of the clamping feet 50, 66, 78, and 94 are preferably each further attached, via the spindles, to operating ends 58, 74, 86, and 102. The operating end preferably includes a transverse pin handle 62, 90, or equivalent, to provide a means for the operator to create torque on the spindle—torque that is converted into compression force as the clamping feet cooperatively couple onto or engage a work piece, i.e. two corner-forming pieces.

Each of the clamping feet 50, 66, 78, and 94 are each preferably operative to swivel on their respective spindles to accommodate uniquely shaped corner pieces and to accommodate deviations in the miter joint or the assembled corner pieces. Also, each of the clamping feet 50, 66, 78, and 94 preferably includes treading 106, or knurling, to provide frictional coupling between the foot and a work piece. This feature promotes accommodation of uniquely shaped work pieces.

Figure 2:
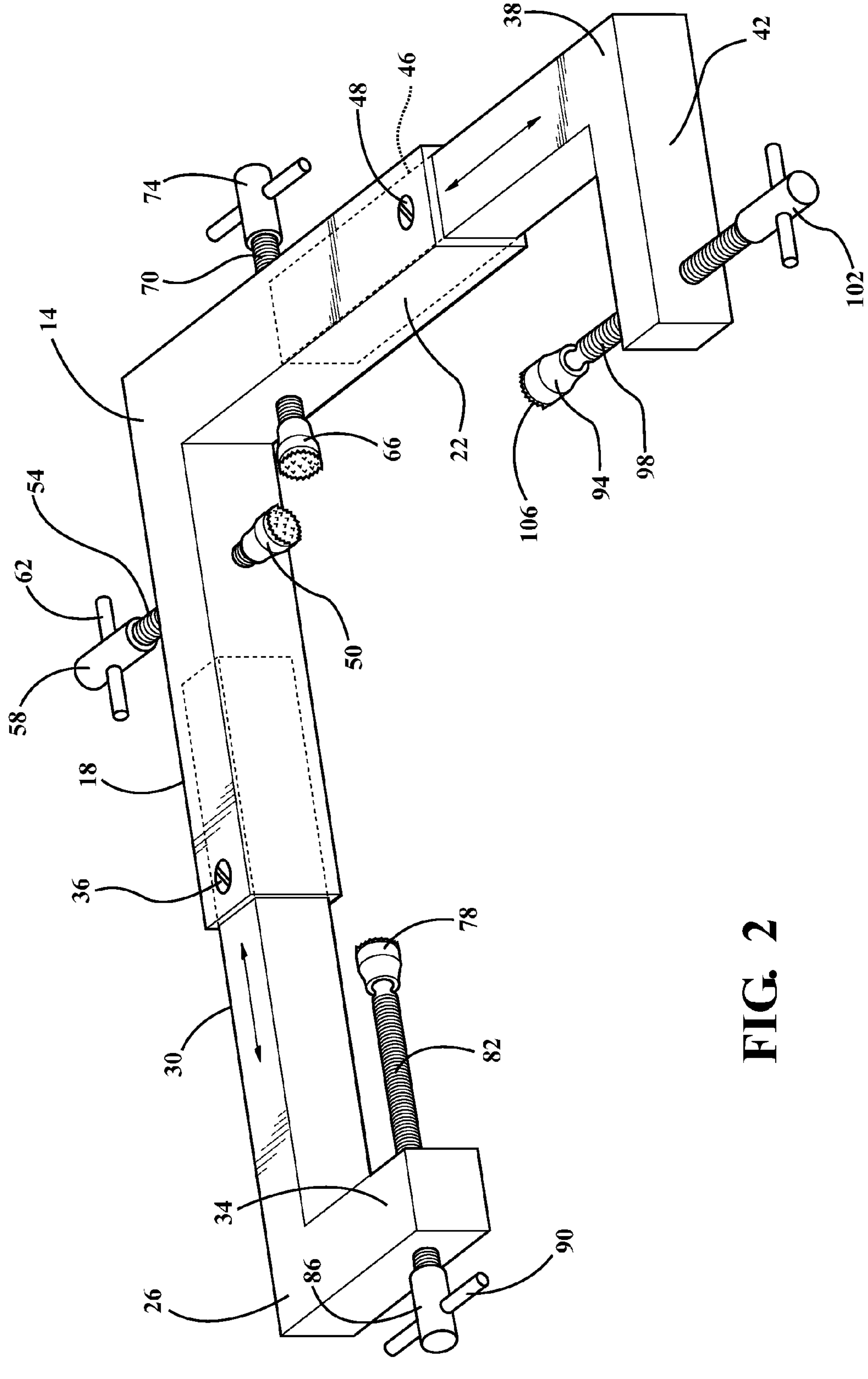
FIG. 2 is a perspective view of the corner clamping apparatus of FIG. 1.

Referring now to FIG. 2, a full isometric view of the corner clamping apparatus 10 according to the exemplary and currently preferred embodiment of the present invention is shown. Steel square tubing, which is the preferred support material, allows the second and third rigid L supports 26 and 38 to slide into the first rigid L support 14, as shown in phantom lines.

Figure 3:
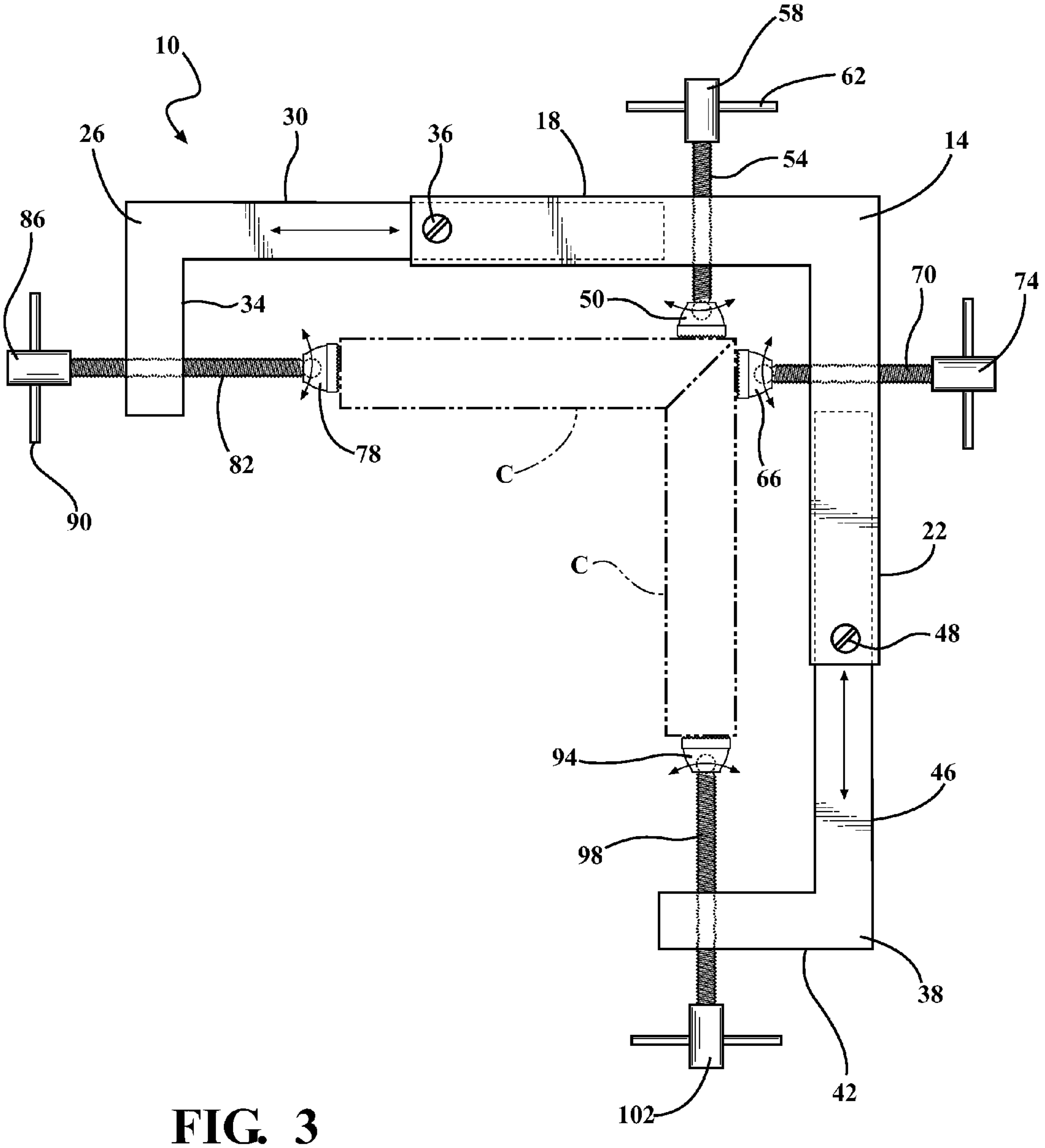
FIG. 3 is a top view of the corner clamping apparatus of FIG. 1, further showing the clamping apparatus receiving and retaining a pair of corner pieces in a corner arrangement.

Referring now to FIG. 3, a full top view of the corner clamping apparatus according to the preferred embodiment of the present invention is shown. The clamping apparatus 10 is shown receiving and retaining a work piece—a pair of corner pieces C that could be a pair of frame strips or could be a pair of corner trim pieces—for example serving when held together to form a right angle corner on a finished item such as a window frame or the corner trim of a house. As a result of this unique arrangement of supports 14, 26, and 38, and of clamping feet 50, 66, 78, and 94, cooperative action between the first, second, third, and fourth clamping feet is operative to receive and securely retain a pair of frame strips in a corner arrangement.

It can be seen from FIG. 3 that the four clamping feet all put pressure on the mitered joint in a direction tending to force and hold the mitered edges of the corner pieces tightly together. The interior clamping feet 50 and 66 that engage the corner at the seam are believed to be the most important for aligning the seam.

Figure 4:
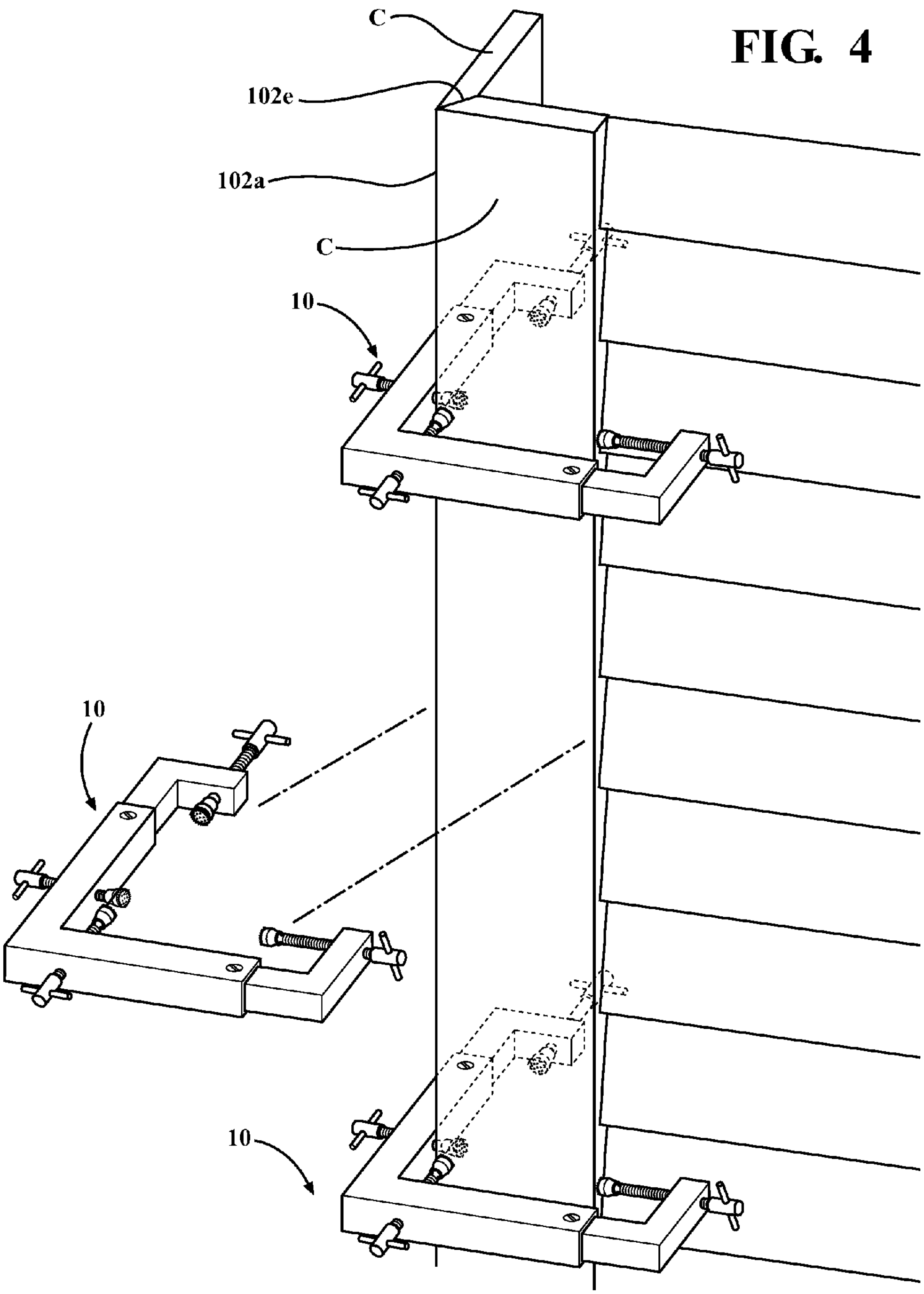
FIG. 4 is a partially exploded perspective view of several corner clamps according to FIGS. 1-3 applied to the corner trim of a house.

Referring to FIG. 4, several clamps 10 are shown in use with corner pieces C, here shown forming a corner trim 104 on a house 100. Once corner pieces C are joined with their mitered inside edges abutting to form a miter seam 104*a*, clamps 10 are applied at multiple locations along the corner 104 to retain the corner pieces in a tight fit until they can be permanently joined, for example by allowing previously-applied glue to set or by nailing or screwing them together. The mitered edges 104*e* of the corner pieces C are mitered at 45-degree angles to form a 90-degree corner as shown in FIGS. 3 and 4. The infinite adjustability of the clamping feet on clamps 10 allows small variations in the end or outside faces of the corner pieces to be accommodated. The four-point adjustable clamping pressure of the feet also allows corner pieces C to be minutely adjusted to overcome variations or imperfections in the alignment or evenness of their mitered edges, so that seam 104*a* can be adjustably clamped as tightly and evenly as possible. The number of clamps 10 applied to a given work piece or corner is in the discretion of the user.

It will finally be understood that the disclosed embodiments are representative of presently preferred examples of how to make and use the claimed invention, but are intended to be explanatory rather than limiting of the scope of the invention as defined by the claims below. Reasonable variations and modifications of the illustrated examples in the foregoing written specification and drawings are possible without departing from the scope of the invention as defined in the claims below. It should further be understood that to the extent the term "invention" is used in the written specification, it is not to be construed as a limiting term as to number of claimed or disclosed inventions or the scope of any such invention, but as a term which has long been conveniently and widely used to describe new and useful improvements in technology. The scope of the invention is accordingly defined by the following claims.

What is claimed:

1. A corner clamping apparatus comprising:

a set of rigid L supports, the set of rigid L supports comprising first, second, and third rigid L supports in a plane and first, second, third, and fourth clamping feet; wherein, the first rigid L support comprises first and second legs, the second rigid L support comprises first and second legs, and the third rigid L support comprises first and second legs, the first legs of the first and second rigid L supports slidingly coupled together, and the second legs of the first and third rigid L supports slidingly coupled together, the second legs of the first and second rigid L supports being held in parallel in the plane and the first legs of the first and third rigid L supports being held in parallel in the plane, the apparatus defining a corner receiving space between the first, second, and third rigid L-supports, and the second leg of the second rigid L support and the first leg of the third rigid L support being terminal legs of the apparatus spaced sufficiently to receive a corner into the corner receiving space; and further wherein, the first clamping foot is adjustably retained in the first leg of the first rigid L support and extends into the corner receiving space, the second clamping foot is adjustably retained in the second leg of the first rigid L support and extends into the corner receiving space at right angles to the first clamping foot, the third clamping foot is adjustably retained in the second leg of the second rigid L support and extends into the corner receiving space, and the fourth clamping foot is adjustably retained in the first leg of the third rigid L support and extends into the corner receiving space at right angles to the third clamping foot, and, wherein the first, second, third, and fourth clamping feet are adjustable toward and away from the corner receiving space in the plane.

2. The clamping apparatus of claim 1, wherein the distance between the second legs of the first and second rigid L supports is adjustable, and wherein the distance between the first legs of the first and third rigid L supports is adjustable.

3. The clamping apparatus of claim 1, wherein the second legs of the first and second rigid L supports are held in parallel in the plane, and the first legs of the first and third rigid L supports are held in parallel in the plane.

4. The clamping apparatus of claim 1, wherein each of the clamping feet is adjustably retained on a threaded spindle.

5. The clamping apparatus of claim 1, wherein at least some of the clamping feet are swivel-mounted on their threaded spindles.

6. The clamping apparatus of claim 1, wherein at least the first rigid L support is tubular, and wherein the second and third rigid L supports slide into the first rigid L support.

7. The clamping apparatus of claim 1, wherein at least the second and third rigid L supports are tubular, and wherein the second and third rigid L supports slide over the first rigid L support.

* * * * *